(12) United States Patent
Hsu et al.

(10) Patent No.: US 9,244,629 B2
(45) Date of Patent: Jan. 26, 2016

(54) METHOD AND SYSTEM FOR ASYMMETRICAL PROCESSING WITH MANAGED DATA AFFINITY

(71) Applicant: Advanced Micro Devices, Inc., Sunnyvale, CA (US)

(72) Inventors: Lisa R. Hsu, Raleigh, NC (US); Gabriel H. Loh, Bellevue, WA (US); James Michael O'Connor, Austin, TX (US); Nuwan S. Jayasena, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 200 days.

(21) Appl. No.: 13/926,765

(22) Filed: Jun. 25, 2013

(65) Prior Publication Data

US 2014/0380003 A1  Dec. 25, 2014

(51) Int. Cl.
*G06F 9/50* (2006.01)
*G06F 3/06* (2006.01)
*G06F 9/48* (2006.01)

(52) U.S. Cl.
CPC .............. *G06F 3/067* (2013.01); *G06F 9/5033* (2013.01); *G06F 9/4881* (2013.01)

(58) Field of Classification Search
CPC ..... G06F 9/4405; G06F 15/177; G06F 3/061;
G06F 9/4406; G06F 9/5094; G06F 2209/5017;
G06F 3/065; G06F 3/067; G06F 9/5033;
G06F 9/505; G06F 9/5077; G06F 9/4881;
G06F 9/50; G06F 9/52
See application file for complete search history.

(56) References Cited

U.S. PATENT DOCUMENTS

| 5,884,077 | A  | * | 3/1999 | Suzuki ........................... 718/105 |
| 6,085,307 | A  | * | 7/2000 | Evoy et al. ..................... 712/31 |
| 7,051,158 | B2 | * | 5/2006 | Chen et al. .................... 711/117 |
| 2003/0200249 | A1 | * | 10/2003 | Gorgone et al. .............. 709/102 |
| 2010/0332797 | A1 | * | 12/2010 | Matsui ............................. 712/35 |
| 2011/0047335 | A1 | * | 2/2011 | Kumura ....................... 711/143 |
| 2014/0181453 | A1 | * | 6/2014 | Jayasena et al. .............. 711/170 |

* cited by examiner

*Primary Examiner* — Hashem Farrokh
(74) *Attorney, Agent, or Firm* — Volpe and Koenig, P.C.

(57) ABSTRACT

Methods, systems and computer readable storage mediums for more efficient and flexible scheduling of tasks on an asymmetric processing system having at least one host processor and one or more slave processors, are disclosed. An example embodiment includes, determining a data access requirement of a task, comparing the data access requirement to respective local memories of the one or more slave processors selecting a slave processor from the one or more slave processors based upon the comparing, and running the task on the selected slave processor.

20 Claims, 5 Drawing Sheets

METHOD AND SYSTEM FOR ASYMMETRICAL PROCESSING WITH MANAGED DATA AFFINITY

BACKGROUND

1. Technical Field

The present invention relates generally to systems with at least one host processor and one or more slave processors with their own memories.

2. Background Art

Computing systems with multiple processors (referred to as multi-processor systems) are widely used in numerous types of applications. Multi-processor systems can be broadly categorized as symmetric multi-processor systems or asymmetric multi-processor systems. The term "symmetric multi-processor system" refers to systems where most of the processors are configured to operate with similar processing capabilities. An "asymmetric multi-processor system" has at least two levels of processors, with a first level of processors configured to allocate work to a second level of processors. A system with one or more central processing units (CPU) and one or more other processors, such as, graphics processing units (GPU) or accelerated processing units (APU) that can receive work allocations from the one or more CPUs and perform the assigned processing may be referred to as an asymmetric multi-processor system.

GPUs generally comprise multiple processing elements that are ideally suited for executing the same instruction on parallel data streams, as in the case of a single instruction multiple data (SIMD) device or in data-parallel processing. In many computing models a CPU functions as the host or controlling processor and hands-off specialized functions, such as graphics processing, to other processors such as GPUs.

Multi-core CPUs, where each CPU has multiple processing cores, offer processing capabilities for specialized functions (e.g., graphics processing) similar to those available on a GPU. One or more of the computation cores of multi-core CPUs or GPUs can be part of the same die (e.g., AMD Fusion™) or, alternatively, in different dies. Recently, hybrid cores having characteristics of both CPU and GPU (e.g., AMD APUs, CellSPE™, Intel Larrabee™) have been proposed for general purpose GPU (GPGPU) style computing. The GPGPU style of computing advocates using the CPU to primarily execute control code and to offload performance critical data-parallel code to the GPU. The GPU is primarily used as an accelerator. The combination of multi-core CPUs and GPGPU computing model encompasses both CPU cores and GPU cores as accelerator targets.

In conventional asymmetrical processing systems the host processor may allocate work to slave processors based upon the type of slave processor, current processing capacity of the respective slave processors, or other techniques such as round robin allocation. These conventional techniques may not optimally utilize the processing resources of the systems. Therefore, methods and systems of work allocation in asymmetrical processing systems that result in improved utilization of processing resources are desired.

SUMMARY OF EMBODIMENTS

Methods, systems and computer readable storage mediums for more efficient and flexible scheduling of tasks on an asymmetric processing system having at least one host processor and one or more slave processors, are disclosed. An example embodiment includes, determining a data access requirement of a task, comparing the data access requirement to respective local memories of the one or more slave processors selecting a slave processor from the one or more slave processors based upon the comparing, and running the task on the selected slave processor. Efficiency of the system may be substantially enhanced by ensuring that tasks are scheduled to slave processors based upon data affinity criteria determined for each such task, and thereby reducing the volume and latency associated with memory accesses across processors.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated in and constitute part of the specification, illustrate embodiments of the invention and, together with the general description given above and the detailed description of the embodiment given below, serve to explain the principles of the present invention. In the drawings.

The disclosure will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION OF EMBODIMENTS OF THE INVENTION

While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The terms "embodiments" or "embodiments of the invention" do not require that all embodiments include the discussed feature, advantage, or mode of operation. Alternate embodiments may be devised without departing from the scope or spirit of the disclosure, and well-known elements may not be described in detail or may be omitted so as not to obscure the relevant details. In addition, the terminology used herein is for the purpose of describing particular embodiments only and is not intended to be limiting. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Embodiments of the present invention may be used in any computer system, computing device, entertainment system, media system, game systems, communication device, personal digital assistant, or any system using one or more processors. The present invention may be particularly useful where the system comprises an asymmetrical processing system. An asymmetrical processing system may be a heterogeneous computing system where a first set of one or more main processors (i.e., host processors) distribute work to one or more second sets of processors (i.e., slave processors). A "heterogeneous computing system," as the term is used herein, is a computing system in which multiple kinds of processors are available.

As problem sizes for computing workloads get larger, moving data to computation, as done in conventional systems, can get costly in terms of computation efficiency. For example, conventional multi-processor systems may execute processes on any available processor without particularly considering the data access requirements of that particular task. Selecting any available processor to execute a process with heavy data needs may result in numerous accesses to various memories across one or more system busses. Such excessive memory traffic on the system busses may lead to degraded performance of the entire system, and may also result in sub-optimal use of power.

In certain embodiments of the present invention, the embodiments can significantly improve the performance of systems by enabling more efficient execution of tasks by ensuring that the tasks are executed close to where most of the data required for each process is located. As used herein, a "task" is run (also referred to as executed) by spawning a process or thread to execute the instructions associated with the task. An asymmetrical processing system embodiment may include a host processor (or processors) which run the operating system (OS) of the system, and a set of supporting chip-stacked memory chips that contain a logic layer with an APU or some other processing element. In such a system, the OS on the host processors can spawn processes to run on the APUs of a particular chip-stack, and ensure as much necessary data as possible is close to that process by allocating both memory and the page table for that process on the memory in the given chip stack. In this way, for example, by moving computation to where the data is located, while a process is running on a slave APU that does not ran an OS, its data needs can largely be satisfied on the chip-stack with minimal or no access to external memories.

Figure 1:
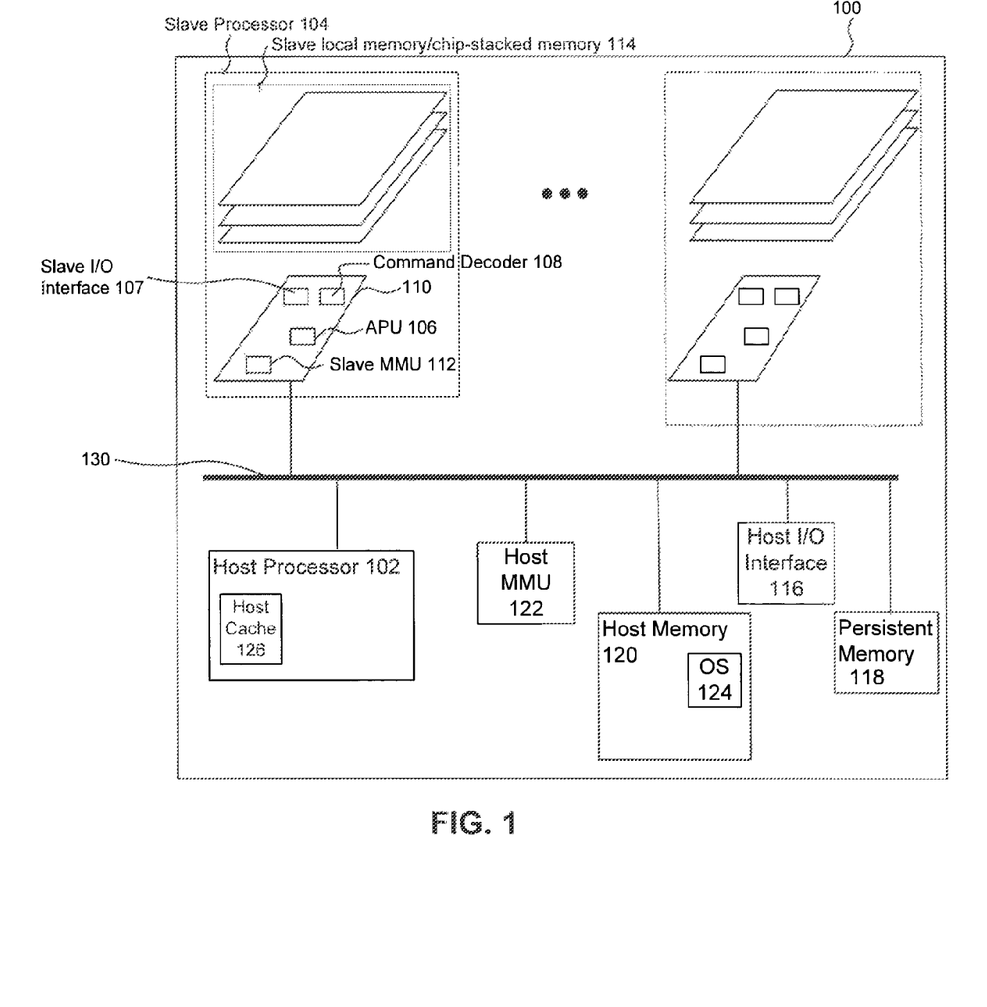
FIG. 1 illustrates a block diagram of a system for asymmetrical processing with managed data affinity, in accordance with an embodiment of the present disclosure.

FIG. 1 illustrates a system 100 in accordance with an embodiment of the present disclosure. System 100 may include an asymmetrical processing system. System 100 includes at least one host processor 102, at least one slave processor 104, a host memory 120, a host memory management unit (host MMU) 122, and an interconnecting infrastructure 130.

Host processor 102 can include a commercially available control processor or a custom control processor. Host processor 102, for example, executes the control logic that controls the operation of asymmetrical processing system 100. Host processor 102 can be a single or multi-core CPU. Host processor 102, in addition to any control circuitry, may include host cache memory 126. Host cache memory 126 can be used to temporarily store instructions and/or parameter values during the execution of an application on host processor 102.

For example, host cache memory 126 can be used to temporarily store one or more control logic instructions, values of variables, or values of constant parameters, from the host memory 120 during the execution of control logic instructions on host processor 102. A person skilled in the art will understand that host processor 102 can include more or less CPU cores than discussed in the example, and can also have either no cache memories or more complex cache memory hierarchies.

Slave processor 104 can include a commercially available or custom designed processor, such as, but not limited to, a GPU or an APU 106. Slave processor 104, for example, can execute specialized code for selected functions. In general, slave processor 104 can be used to execute graphics functions, such as graphics pipeline computations, rendering of image on a display, and complex computations. In various embodiments, slave processor 104 can also execute computer processing operations (e.g., those operations unrelated to graphics such as, for example, video operations, physics simulations, computational fluid dynamics, etc.), based on commands or instructions received from an I/O interface (e.g., I/O interface 107) or command decode module (e.g., command decode module 108) in slave processor 104. While embodiments discuss integration of a processing resource such as an APU with memory, other computing devices including, but not limited to, CPUs, GPUs, FPGAs (field programmable gate array), DSPs (digital signal processor), or other processor devices can also be used. Such processor devices may include one or more scalar and/or vector processing units. In some embodiments, slave processor 104 may include a plurality of single instruction multiple data (SIMD) processing elements.

According to an embodiment, slave processor 104 comprises a logic layer 110 including an APU 106 and a chip-stacked memory 114. According to this embodiment, for example, slave processor 104 can be formed using 3-D die-stacking technology that enables logic dies (e.g., 110) and memory dies (e.g., 114 is illustrated as comprising of multiple dies) to be stacked in a manner that enables high-bandwidth, low-latency access to the memory from the logic die stacked with it. 3-D die-stacked slave processor 104 may be formed as described in co-pending U.S. patent application Ser. No. 13/721,395 filed on Dec. 20, 2012 and titled "A PROCESSOR WITH HOST AND SLAVE OPERATING MODES STACKED WITH MEMORY", which is hereby incorporated by reference in its entirety. In an asymmetrical processing system 100, a 3-D die-stacked (also referred to as chip-stacked) slave processor 104 creates opportunities to offload memory intensive processing or selected "intelligent" memory operations to the logic-memory module which forms slave processor 104. Slave processor 104 may form a single processor/system-on-a-chip (SOC) module. 3D die-stacking enables the multiple memory dies included in memory 114 and logic die 110 to be stacked vertically in a single package on top of each other and connected via through-silicon vias (TSVs). This includes stacking one or more logic dies with one or more memory dies. In such a system, the logic die 110 can be used to implement processors that are coupled to the stacked memory via high-bandwidth and low-latency connections.

According to an embodiment, slave processor 104 is configurable to manage virtual memory and operate in a configured operating mode. The operating mode is selected from a set of operating modes comprising a host operating mode and a slave operating mode. Selection of the host operating mode or slave operating mode for slave processor 104 may be achieved in any of several configuration mechanisms. When in host operating mode, slave processor 104 may operate as a standalone processor. When in slave operating mode, slave processor 104 is not required to run an OS and relies upon host processor 102 for OS-related services.

When slave processor 104 is in slave operating mode, translation from virtual to physical address spaces can be managed remotely by the OS on the host processor 102. For example, in an embodiment, the host processor 102 can be configured to only issue commands to a slave processor 104 operating in a slave operating mode where all accesses for the command are included within the physical pages (or other contiguous regions of physical memory) for which physical addresses or address translations are provided by host processor 102 along with the command. In this case, slave processor 104 does not require any address translation capabilities. In another embodiment, address translation management by the external host processor can be achieved when slave processor 104 has access to an I/O Memory Management Unit (IOMMU), such as slave MMU 112 and/or host MMU 122 described below, that can walk the page tables of slave processor 104 to locate virtual to physical translations. When the IOMMU encounters a miss within the page table, IOMMU communicates the page fault to the operating system running on the external host processor.

Slave memory 114 includes memory, such as dynamic random access memory (DRAM). Slave memory 114 can store, for example, processing logic instructions, constant values, and variable values during execution of portions of applications or other processing logic by slave processor 104 or an external host processor, such as, host processor 102. For example, in one embodiment, parts of control logic to perform one or more operations on slave processor 104 can reside within slave memory 114 during execution of the respective portions of the operation by APU 106. During execution, respective applications, operating system functions, processing logic commands and system software can reside in slave memory 114. Control logic commands fundamental to an operating system run by APU 106 will generally reside in memory 114 during execution. Other software commands, including, for example, commands from a command decode module (e.g., 108) in the logic layer 110 can also reside in slave memory 114 during execution of slave processor 104. Access to memory 114 can be managed by a slave memory controller 112, which is communicatively coupled to slave memory 114 (and, when applicable, to each of the respective memory dies in slave memory 114). It should be understood that embodiments are applicable to designs based on memory technologies such as DRAM and other non-volatile memory technologies such as PCM, STT-MRAM, Memristor, hybrids of different memory technologies, as well as designs with multiple logic dies.

Slave memory management unit (slave MMU) 112 may be a digital circuit which manages the flow of data going to and from the slave memory 114. It can be a separate chip or integrated into another chip, such as logic die 110. Slave MMU 112 includes the logic to read and write to slave local memory 114.

Slave I/O interface 107 manages I/O operations to and from slave processor 104, and may include support for standard interfaces such as, but not limited to, Peripheral Component Interconnect Express (PCIe), USB and display ports as well as debug and other external interfaces.

Command decode module 108 is configured to receive all commands received from the external host processor and pass the commands to APU 106 when operating in the slave operating mode. Command decode module 108 is further configured to determine the command type of a received command. The type of processing performed on slave processor 104 may be determined based upon the command type. According to an embodiment, the command type determines which part of slave processor 104 will handle the command. According to an embodiment, commands can be a processed at different processing destinations of slave processor 104. The processing destination can be either the one or more memory dies in slave memory 114 or APU 106 in the logic layer 110 of the slave processor 104. For example, fine grain memory access commands, such as logical byte, word, or block loads and stores, can be a first command type. Such commands will bypass APU 106 and are handled by the memory stack 114, possibly under control of the memory controller 112. Such commands are not complex and thus handling of the commands by the memory dies is efficient for slave processor 104. In a second command type, APU 106 is configured to process the commands. Commands of a second command type, for example, can include complex commands that require one or more sequencing operations to be performed, such as a memory access or arithmetic operations. Another example of a complex command of a second command type can include user generated commands, according to an embodiment. User-generated commands include a pointer to a user-defined software routine and one or more operands. The operands may include pointers to data structures stored in memory dies. In response to a user-generated command, APU 106 is configured to execute the specified user-defined software routine.

Host memory 120 can include at least one non-persistent memory such as DRAM. Host memory 120 can store processing logic instructions, constant values and variable values during execution, on host processor 102 and/or on a slave processor 104, of portions of applications or other processing logic. The term "processing logic," as used herein, refers to control flow instructions, instructions for performing computations, and instructions for associated access to resources.

Persistent memory 118 includes one or more storage devices capable of storing digital data such as magnetic disk, optical disk, or flash memory. Persistent memory 118 can, for example, store at least parts of instruction logic of an operating system, applications or other programs. At the startup of asymmetrical processing system 100, the operating system and other application software can be loaded in to host memory 120 from persistent memory 118.

Host memory management unit (MMU) 122 operates to manage access to host memory 120. Host MMU 122 may, in addition, operate to manage slave local memory 114 at one or more of the slave processors 104. In an embodiment, host MMU 122 may coordinate with respective slave MMU 112 when managing the slave local memories 114.

System bus 130 can include a Peripheral Component Interconnect (PCI) bus, PCI Express (PCIe) bus, Industry Standard Architecture (ISA) bus, or such a device. System bus 130 can also include a network, such as a local area network (LAN), along with the functionality to couple components, including components of heterogeneous computing system 100.

Input/output interface 116 includes one or more interfaces connecting user input/output devices, such as keyboard, mouse, display and/or touch screen. For example, user input can be provided through a keyboard and mouse connected user interface 116 to system 100. The output of heterogeneous computing system 100 can be output to a display through user interface 116.

According to another embodiment, host processor 102 may be a chip-stacked processor, on which an OS is run and which is capable of spawning threads or processes (or some other such unit of work on the slave processor 104) corresponding to a particular task.

Figure 2A:
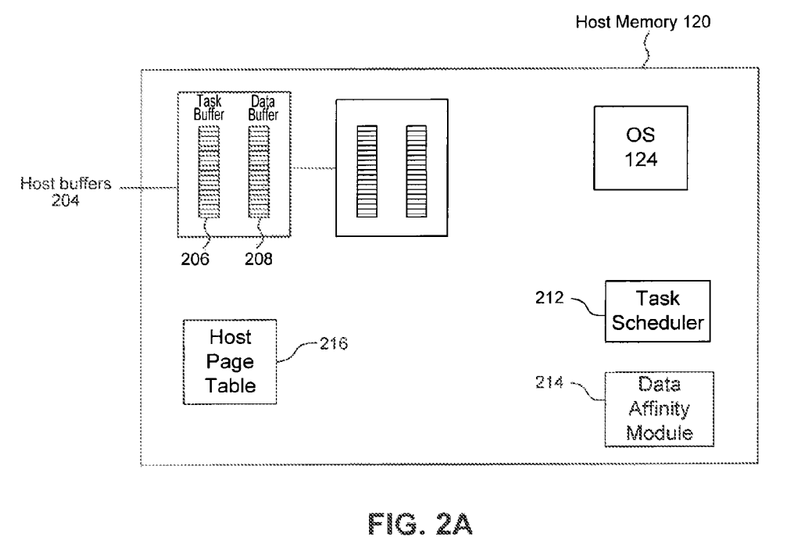
FIGS. 2A and 2B are block diagram illustrating respectively a host memory and a slave processor memory of the system illustrated in FIG. 1, in accordance with an embodiment.
Figure 2B:
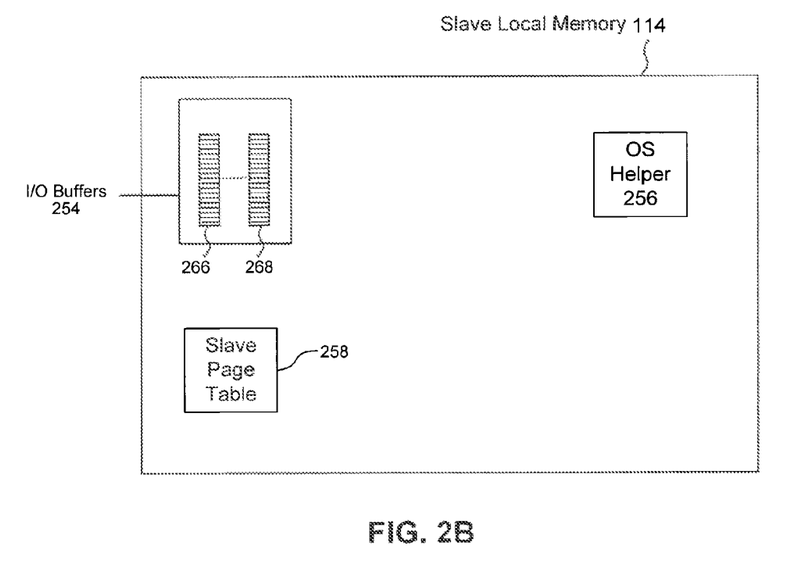

FIGS. 2A and 2B are block diagrams illustrating a host memory and a slave local memory, respectively, of the system illustrated in FIG. 1 in accordance with one or more embodiments. FIG. 2A illustrates a host memory 120 that includes an operating system (OS) 124, one or more host buffers 204 for communication between the at least one host processor 102 and the one or more slave processors 104, a host page table 216, a task scheduler 212 and a data affinity module 214. According to an embodiment, each host buffer 204 includes a task buffer (also referred to as command buffer) 206 and data buffer 208. Task buffer 206 is configured for sending and/or receiving commands between host processor 102 and one or more slave processors 104. Data buffer 208 is configured for exchanging data between host processor 102 and one or more slave processors 104. Task buffers 206 and data buffers 208 may be configured in accordance with any buffer management technique and, in some embodiments may be configured as ring buffers. In some embodiments, a host buffer 204 is created for each pair of processors that have an on-going communication.

OS 124 is executed by one or more host processors 102, and may reside at least partly in host memory 120.

Host page table 216 is used to keep track of the memory allocations in host memory 120. In some embodiments, host page table 216 further keeps track of memory allocations in one or more slave memories 114. Keeping track of memory allocation in one or more slave memories 114 may be performed in coordination with one or more slave page tables 216 residing in respective slave memories 114.

Task scheduler 212 operates to schedule one or more tasks at respective slave processors 104. According to an embodiment, task scheduler 212 includes logic instructions to spawn one or more tasks based upon a sequence of commands executing on host processor 102, determine data requirements of the one or more spawned tasks, determine the location of data to be accessed by the respective spawned tasks, and to transfer each task to a slave processor 104 where that task would have the most local access to its required data.

Data affinity module 214 operates to determine the location of selected data, and to move data from host memory 120 to one or more slave memories 114 or between the one or more slave memories 114 such that the presence of data where that data is needed for processing is improved. For example, data affinity module 214 may operate to move one or more data blocks from a first slave processor to a second slave processor, so that the data may be more quickly available to the second slave processor, which is configured to need that data.

FIG. 2B illustrates a slave memory 114 that includes IO buffers 254 that are configured for use in communicating with host processor 102 or other slave processors 104. According to an embodiment, in any slave local memory 114, at least one IO buffer 254 is configured for each host processor 102 or other slave processor 104 with which the selected slave processor 104 communicates. Each IO buffer 254 may include a command buffer 266 and data buffer 268, used for exchanging commands and for data, respectively.

According to an embodiment, slave local memory 114 may include an OS helper 256. In an embodiment, when operating in a slave operating mode, slave processor 104 is not required to run a mainstream OS and may instead run a specialized or minimal OS, such as OS helper 256, or no operating system. This OS helper code can handle simple operations, such as allocating/deallocating memory from the stack, local (in-stack) page table management, etc., and can also act as a transparent proxy/interface back to the "full-featured" OS running on the host processor(s).

Slave local memory 114 can also include a slave page table 258. Slave page table 258 may include a portion of the host page table 216, and may enable a task executing on slave processor 104 to perform any page table lookups and/or allocations locally to the slave processor 104. According to an embodiment, slave page table 258 may be part of a distributed page table in system 100, where the system page table is distributed across the at least one host processor and one or more of the slave processors.

As will be apparent to one of ordinary skill in the art, the simulation, synthesis and/or manufacture of the various embodiments may be accomplished, in part, through the use of computer readable code (as noted above), including general programming languages (such as C or C++), hardware description languages (HDL) including Verilog HDL, VHDL, Altera HDL (AHDL) and so on, or other available programming and/or schematic capture tools (such as circuit capture tools). This computer readable code can be disposed in any known computer usable medium including semiconductor, magnetic disk, optical disk (such as CD-ROM, DVD-ROM) and as a computer data signal embodied in a computer usable (e.g., readable) transmission medium (such as a carrier wave or any other medium including digital, optical, or analog-based medium). As such, the code can be transmitted over communication networks including the Internet and internets. It is understood that the functions accomplished and/or structure provided by the systems and techniques described above can be represented in a core (such as a GPU core, CPU core, APU core and the like) that is embodied in program code and may be transformed to hardware as part of the production of integrated circuits. As will be appreciated, other types of cores or processing units can provide the functions and/or structure embodying aspects of the contemplated embodiments. These processing units may include, for example, CPUs, the aforementioned graphics processing units, digital signal processors, application processors and the like.

Figure 3:
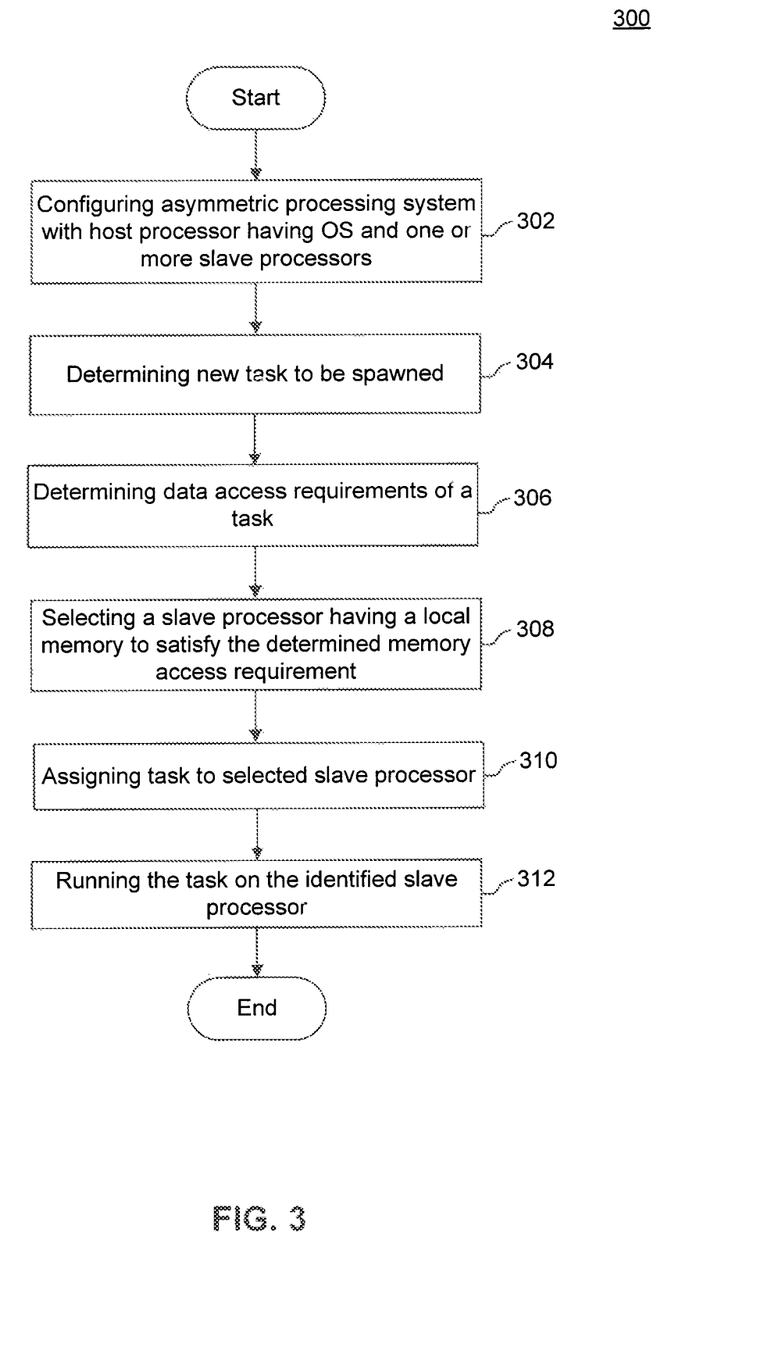
FIG. 3 illustrates a flowchart of a method for asymmetrical processing with managed data affinity, in accordance with an embodiment of the present disclosure.

FIG. 3 illustrates a flowchart of a method 300 of processing on an asymmetrical processing system with managed data affinity, in accordance with an embodiment of the present disclosure. Method 300 may be performed on an asymmetrical processing system 100. In some embodiments, one or more of stages 302-312 of method 300 may not be required, or one or more stages 302-312 may be performed in a different order than illustrated. According to an embodiment, method 300 may be performed by task scheduler 212.

At stage 302, an asymmetric processing system, such as system 100, is configured for operation. The configuration may include executing an OS (e.g., OS 124) on the at least one host processor (e.g., host processor 102). The OS may be any OS and provides for various functions including process management, I/O management, memory management, and like functions that are used in executing processes. The OS may at least partly exist in host memory (e.g., 120) during its execution by the host processor. Configuration of the host processor may also include setting up a page table (e.g. host page table 216) that tracks memory allocations throughout the system.

Configuration of the system also includes configuring of one or more slave processors (e.g. slave processor 104). In some embodiments, as discussed above, one or more slave processors 104 may include processors having 3-D die-stacked memory layers and a logic layer including an APU. When configured to operate in a "slave mode," slave processor 104 is not required to run a full OS (e.g., OS 124) and may instead run a minimal operating system (e.g., OS helper 256) or no operating system.

At stage 304, during the execution of a sequence of commands (e.g., an application or program) the host processor determines a new task to be spawned. The new task may be, for example, to perform a rendering operation, geometric computation, or other computation-intensive operation. According to an embodiment, the new task is directed to perform one or more operations that can be performed by at least one of the slave processors.

At stage 306, the host processor determines the data access requirements of the new task and where the data is located. The "data access requirement" of a task represents the data to be read or written by the task. The determination of the data access requirements can be made, according to an embodiment, by analyzing the code (e.g., instruction sequence for the task). For example, memory addresses of the various data items may be analyzed to determine the presence of the majority of the required data at any one or more of the slave processors and/or in the host memory. The current location of the data may be determined based upon page tables (e.g., page table 216). For example, virtual addresses of the data being read or written by the task, as they appear in the sequence of instructions of the task, may be mapped to physical addresses using page table 216.

At stage 308, a slave processor 104 that satisfies the data access requirement of the new task is selected. Satisfying the data access requirement of the new task may include identifying that at least a predetermined portion of the data to be read or written by the new task is present in a selected slave processor. The selection may be preceded by comparing the data access requirement to a plurality of the slave processors to determine which of the slave processors best satisfy the particular data access requirement. The information about each slave processor or about the local memory of each processor to which the data access requirement is compared may include data stored in the local memory, the size of the free memory in the local memory, and other information that is helpful to making a determination as to whether to assign a task to that slave processor. According to an embodiment, the slave processor that accommodates the largest portion of the data access requirements in its slave local memory is the selected slave processor.

In another embodiment, data from one or more other slave processors may be migrated (e.g., moved) to the selected processor so that the selected slave processor now has at least a predetermined portion of the data access requirements of the new task present within itself.

The mechanism by which page assignments are determined so as to allocate data to different slave processors can be determined in several ways. One embodiment may determine the assignment of pages to various slave processors via consistent hashing techniques. Some embodiments may also use performance counters associated with pages in the various translation lookaside buffers (TLB) of the slave local memories to track and record references to local and remote pages. In some embodiments, the page placement software (e.g., data affinity module 214) can take advantage of these counters to dynamically migrate the data for certain pages to minimize the power and performance costs associated with remote data access.

A person of skill in the relevant arts will appreciate that the threshold for determining the selected slave processor on which to run the new task may be based upon any one of the above noted criteria, any combination thereof, or some other technique that takes into account the presence within the selected slave processor of data required by the new task.

At stage 310, the new task is assigned to the selected slave processor for execution. Assigning the new task to the slave processor may include copying one or more commands from the host processor or host memory to the slave processor. For example, a sequence of commands corresponding to the new task may be queued into the command buffer in the host memory to be accessed by the slave processor. Assigning a task may also include transferring a page table or part of a page table for autonomous local use by the slave processor where the page table or part of the page table includes memory associated with the new task (e.g., blocks of memory to be accessed by the new task).

In another embodiment, assigning a new task to a slave processor may also include transferring some data to that slave processor, so that the new task can execute on the slave processor with substantial autonomy. In some embodiments, data migration may be used to aggregate related data into the memory stacked with slaves in a manner that minimizes the amount of data that needs to be moved and enables efficient invocation of processes or tasks on slave processors.

In yet another embodiment, assigning a new task to a slave processor also includes buffer configuration in a manner that optimizes data movement within the system. The OS on the host processor may also allocate other software-invisible structures in a way that preserves/boosts spatial locality within the stack. For example, OS file buffers to support disk IO may be allocated within the slave memory and used for file IO corresponding to the tasks scheduled to run on the CPUs/APUs under that slave memory. In this manner, the OS on the host processor can directly DMA data from disk (or network, or other peripheral) to the slave memory (e.g., memory stack), which can then subsequently be directly used by the local processes such as the new task on the slave processor (as opposed to direct memory accessing to some arbitrary location such as the host processor memory, and then re-copying to the slave local memory).

In another embodiment, the OS may coordinate with other system/runtime software such as the task scheduler. In a task-oriented computation (e.g., heterogeneous system architecture-like task queues), the OS and runtime task schedule may coordinate in such a way that the OS maps memory to specific memory stacks, and then informs the runtime task scheduler of the mapping so that the scheduler can dispatch tasks to the stacks in a way that increases the likelihood that the task's data will mostly be serviceable from within its stack (e.g., to minimize the number of memory transfers from other stacks or the host processor memories).

At stage 312, the new task is spawned and run (also referred to as executed) on the selected slave processor. The running of the task may also include resolving memory access requests, for example, by accessing a page table to resolve virtual to physical address mappings. Moreover, if the new task executing on the slave processor runs out of memory, then additional memory may have to be allocated.

According to an embodiment, while executing on the slave processor, the new task uses a locally maintained page table to allocate memory from one or more blocks of memory which may have been allocated for the new task by the host processor. The slave processor informs the host processor of any page faults or any additional memory needs so that the host processor can allocate further memory blocks as needed and so that the page table at the host processor can be maintained to correctly reflect memory allocations throughout the system.

Figure 4:
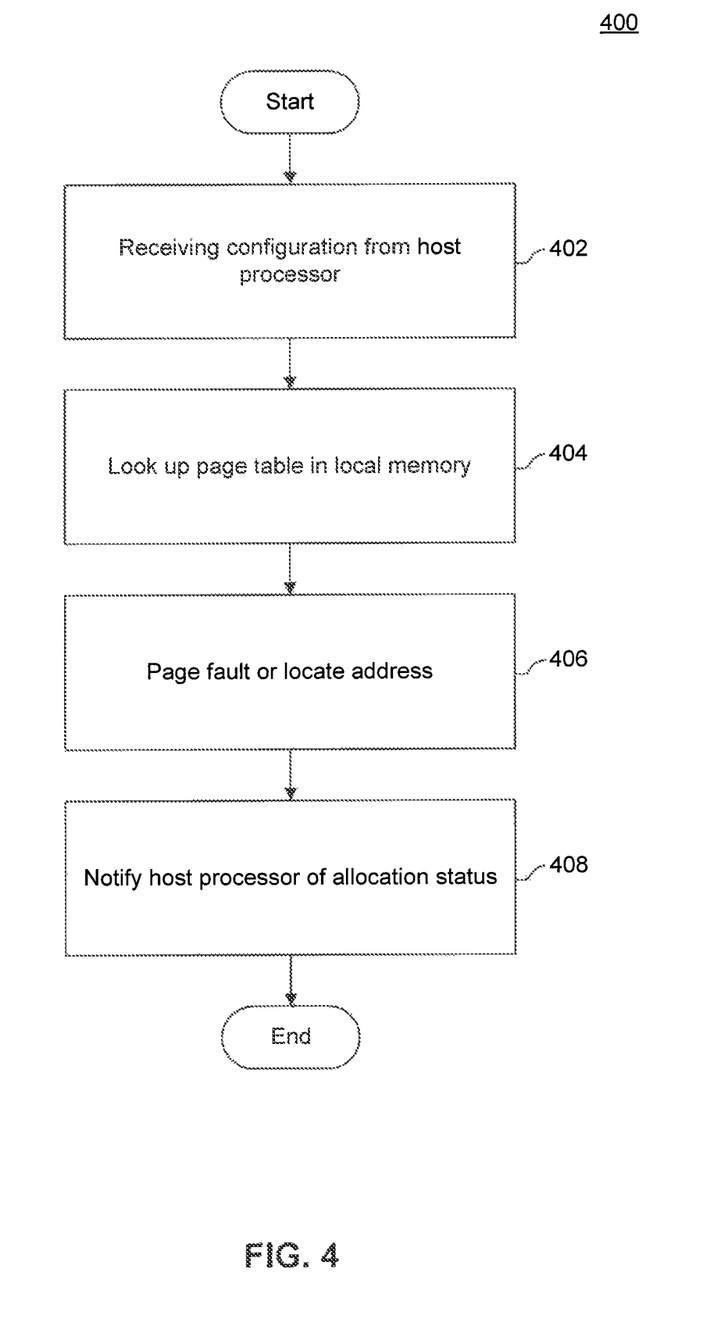
FIG. 4 illustrates a flowchart of a method for a slave processor performing memory operations, according to an embodiment.

FIG. 4 illustrates a flowchart of a method for a slave processor performing memory operations, according to an embodiment. Method 400 may be performed on an asymmetrical processing system 100. In embodiments, one or more stages 402-408 may not be required, and, farther, one or more stages 402-408 may be performed in an order different from that illustrated.

At stage 402, a slave processor in an asymmetrical system (e.g., slave processor 104 in system 100) receives configuration from a host processor (e.g., host processor 102). The received configuration may include one or more new tasks to be executed on the slave processor, and also one or more page tables associated with the new tasks. The page tables sent to the slave processor may include only portions of the page table at the host processor. For example, a page table sent to the slave processor (e.g., slave page table 258) may include a portion of the page table (e.g., host page table 216) accessed by the host processor. The portion of the table selected to be sent to the slave processor may include memory pages relevant to a new task that is to be executed on the slave processor.

According to one embodiment, the slave processor is not configured to execute an OS. According to another embodiment, the slave processor may be configured to execute a set of minimal OS or OS-like functions (e.g., OS helper 256). The OS helper code may enable handling simple in-stack operations such as allocating/deallocating memory from the stack, local (in-stack) page table management, etc., and can also act as a transparent proxy/interface back to the "full-featured" OS running on the host processor(s). For example, the minimal OS functions may include page table lookup (sometimes referred to as page table walks), updating the local page table upon allocating memory to the new task, and running of tasks assigned to the slave processor by the host processor. The memory from which allocations are made by the slave processor for the new task may be from a block of memory that is already set aside by the host processor for that new task.

In another embodiment, when the slave processor is configured to run an OS helper code, the host processors may proactively configure a pool of unused physical memory from the slave's local memory under the control of the slave processor for autonomous management by the slave processor. The slave processor is still responsible to inform the host of new mappings for pages that may be shared with other processors. Once the pool is depleted, the slave processor may request additional physical memory space from the host processor or implement its own page replacements within the already allocated pool.

In another embodiment, such as, for example, in cases where the task assigned to the slave processors is less than a full process (e.g., when an entire page table is not allocated on the slave), a slave processor may be given permission to manage a subset of the page hierarchy (e.g., a subset of the page directory nodes below the root level in a multi-level page table, and the corresponding leaf nodes) that corresponds to the virtual address range(s) of data contained within the slave local memory.

At stage 404, in response to a memory access by the new task which is executing on the slave processor, the slave processor looks up the page table in the local memory (e.g., slave local memory 114). The lookup of the page table may be preceded by a translation lookaside buffer (TLB) lookup.

At stage 406, if the memory access can be resolved by the page table at the slave processor, then the mapping is performed locally and processing of the new tasks continues. If, on the other hand, the local page table at the slave processor does not have an entry for the requested memory access, then a page fault (or equivalent of a page fault) may be raised to handle the miss condition.

At stage 408, the slave processor notifies the host processor of the status of the memory allocation. If, at stage 406, the memory allocation was successfully handled locally and any updates were made to the local page table at the slave processor, then the host processor is notified of those updates to the slave page table so that the correctness of the host page table can be maintained. If, at stage 406, a page fault (or equivalent of a page fault) was raised, then the slave processor requests the host processor to make a new allocation. In another embodiment, in the event of a page fault (or equivalent of a page fault) being raised at the slave processor, the slave processor may allocate additional memory from its own memory. The slave processor may receive approval from the host processor for any such allocations. As noted above, the host page table maintains the correct view of the entire memory of the system.

Figure 5:
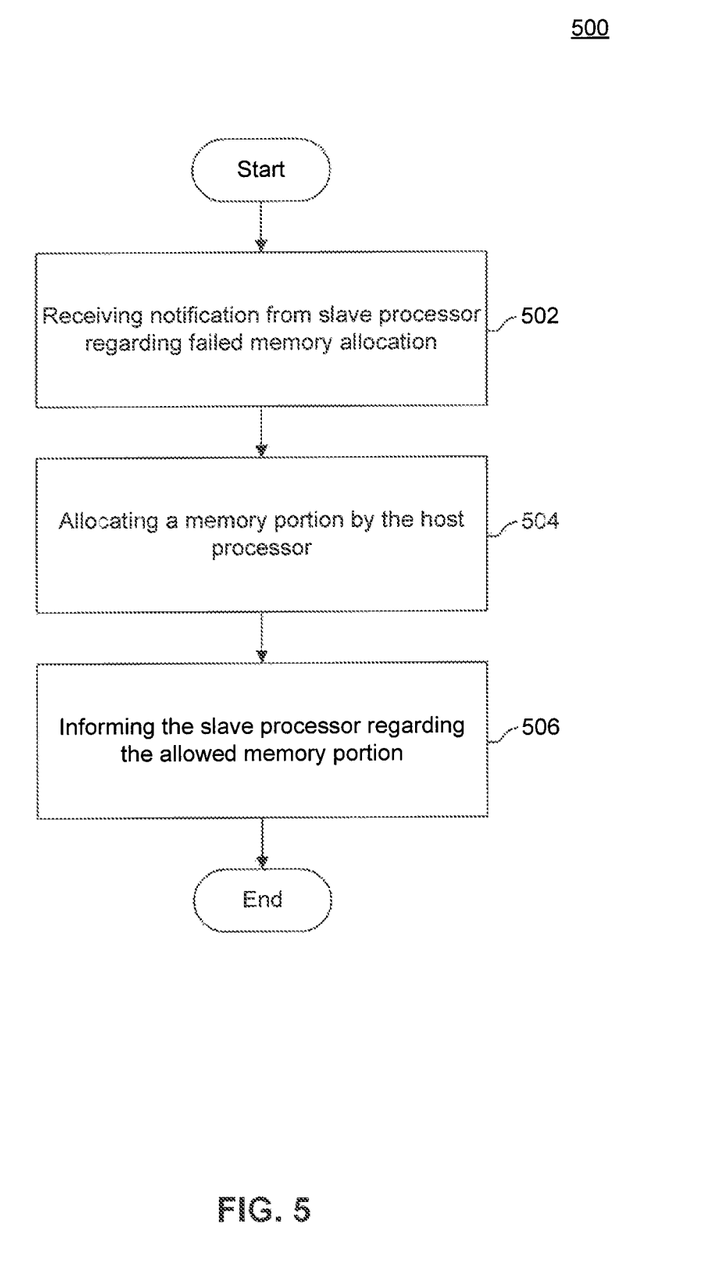
FIG. 5 illustrates a flowchart of a method for a host processor performing memory operations in cooperation with a slave processor, according to an embodiment.

FIG. 5 illustrates a flowchart of a method for a host processor performing memory operations in cooperation with a slave processor, according to an embodiment. Method 500 may be performed on an asymmetrical processing system 100. In embodiments, one or more of the stages 502-506 may not be required, and, further, one or more stages 502-506 may be performed in an order other than the illustrated order.

At stage 502, the host processor receives notification from a slave processor that a memory allocation has failed. For example, during the running of a spawned new task on the slave processor using a page table locally maintained at the slave processor, a page fault (or equivalent of a page fault) may have occurred. The notification to the host processor may be responsive to such a page fault.

At stage 504, the host processor allocates memory to the slave processor. According to an embodiment, the new allocation is from the local memory of the slave processor. According to another embodiment, the new allocation may include one or more blocks of memory from host memory and/or other slave memories. The host processor may update the host page table with the new allocation.

At stage 506, the host processor informs the slave processor regarding the new memory allocation. The host processor may, when allocating new memory blocks, provide for updating a locally maintained portion of the page table at the slave processor.

A person of skill in the art will understand that heterogeneous computing system 100 can include more or less components that shown in FIG. 1. For example, heterogeneous computing system 100 can include one or more network interfaces, and or software applications such as the OpenCL framework.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of processing in an asymmetrical processing system having at least one host processor and one or more slave processors, the method comprising:
    determining data access requirements of a task and a location of instructions associated with the task in memory;
    comparing the data access requirement of the task and the location of instructions associated with task to information about respective local memories of the one or more slave processors;
    selecting a slave processor from one or more slave processors based upon comparing the data access requirement of the task and the location of instructions associated with task to information about respective local memories of the one or more slave processors; and
    running the task on the selected slave processor.

2. The method of claim 1, wherein the comparing includes detecting one or more accesses to a stored data by the task, and determining one or more memory pages including the stored data, wherein the one or more memory pages are located in the respective local memories.

3. The method of claim 1, wherein the selecting a slave processor comprises:
    detecting a data segment corresponding to the data access requirement in a second local memory which is not a local memory of the selected slave processor; and
    copying the data segment to the local memory of the selected slave processor.

4. The method of claim 1, further comprising:
    configuring the at least one host processor to execute an operating system; and
    configuring the one or more slave processors without an operating system.

5. The method of claim 1, wherein the running comprises accessing a chip-stacked memory of the selected slave processor as a local memory.

6. The method of claim 1, further comprising:
    configuring the selected slave processor to map virtual pages to physical pages using a page table in the local memory of the selected slave processor.

7. The method of claim 6, wherein the slave processor is further programmed to execute an operating system helper code.

8. The method of claim 1, further comprising:
    receiving information regarding a failed memory allocation by the selected slave processor;
    allocating a memory to the selected slave processor; and
    informing the slave processor regarding the allocated memory.

9. The method of claim 8, wherein the allocated memory portion is in the local memory of the selected slave processor.

10. The method of claim 8, wherein the allocated memory portion is in a second local memory, wherein the second local memory is local to a second slave processor.

11. The method of claim 1, further comprising:
    configuring a pool of memory in the local memory of the selected slave processor for control by an operating system helper code executing on the selected slave processor.

12. The method of claim 1, further comprising:
    configuring a subset of a page hierarchy that corresponds to one or more virtual address ranges of data contained within the local memory of the selected slave processor for control by the selected slave processor.

13. The method of claim 1, further comprising:
    copying one or more selected data from a second processor to the selected slave processor, wherein the copied one or more selected data corresponds to the data access requirement of the task.

14. The method of claim 1, further comprising:
    allocating operating system input/output file buffers in the associated local memory of the selected slave processor, wherein the allocated operating system input/output file buffers are configured for use by the task when executing on the selected slave processor.

15. An asymmetrical processing system, comprising:
    at least one host processor executing an operating system;
    one or more slave processors communicatively coupled to the at least one host processor, each of the slave processors having a local memory,
    wherein the at least one host processor is configured to:
    determine data access requirements of a task and a location of instructions associated with the task in memory;
    compare the data access requirement of the task and the location of instructions associated with task to information about respective local memories of the one or more slave processors;
    select a slave processor from the one or more slave processors based upon comparing the data access requirement of the task and the location of instructions associated with task to information about respective local memories of the one or more slave processors; and
    run the task on the selected slave processor.

16. The asymmetrical processing system of claim 15, wherein the at least one host processor is further configured to:
    detect one or more accesses to a stored data by the task; and
    determine one or more memory pages including the stored data, wherein the one or more memory pages are located in the respective local memories.

17. The asymmetrical processing system of claim 15, wherein the respective local memory of each of the one or more slave processors is a chip-stacked memory.

18. The asymmetrical processing system of claim 15, wherein the at least one host processor is further configured to:
    copy one or more selected data from a second processor to the selected slave processor, wherein the copied one or more selected data corresponds to the data access requirement of the task.

19. The asymmetrical processing system of claim 15, wherein the at least one host processor is further configured to:
    allocate operating system input/output file buffers in the associated local memory of the selected slave processor, wherein the allocated operating system input/output file buffers are configured for use by the task when executing on the selected slave processor.

20. A non-transitory computer readable storage medium having instructions encoded thereon, execution of which by at least one host processor in an asymmetrical processing system having the at least one host processor and one or more slave processors cause execution of a method, the method including operations comprising:
    determining data access requirements of a task and a location of instructions associated with the task in memory;

comparing the data access requirement of the task and the location of instructions associated with task to information about respective local memories of the one or more slave processors;

selecting a slave processor from one or more slave processors based upon comparing the data access requirement of the task and the location of instructions associated with task to information about respective local memories of the one or more slave processors; and running the task on the selected slave processor.

* * * * *